Aug. 5, 1947.                E. M. OSTLUND ET AL                2,424,999
                              PULSE GENERATING SYSTEM
                              Filed March 13, 1943            4 Sheets-Sheet 1

INVENTORS
EVERT MANUEL OSTLUND
PAUL N. SOKOLOFF
BY
Percy P. Lantz
ATTORNEY

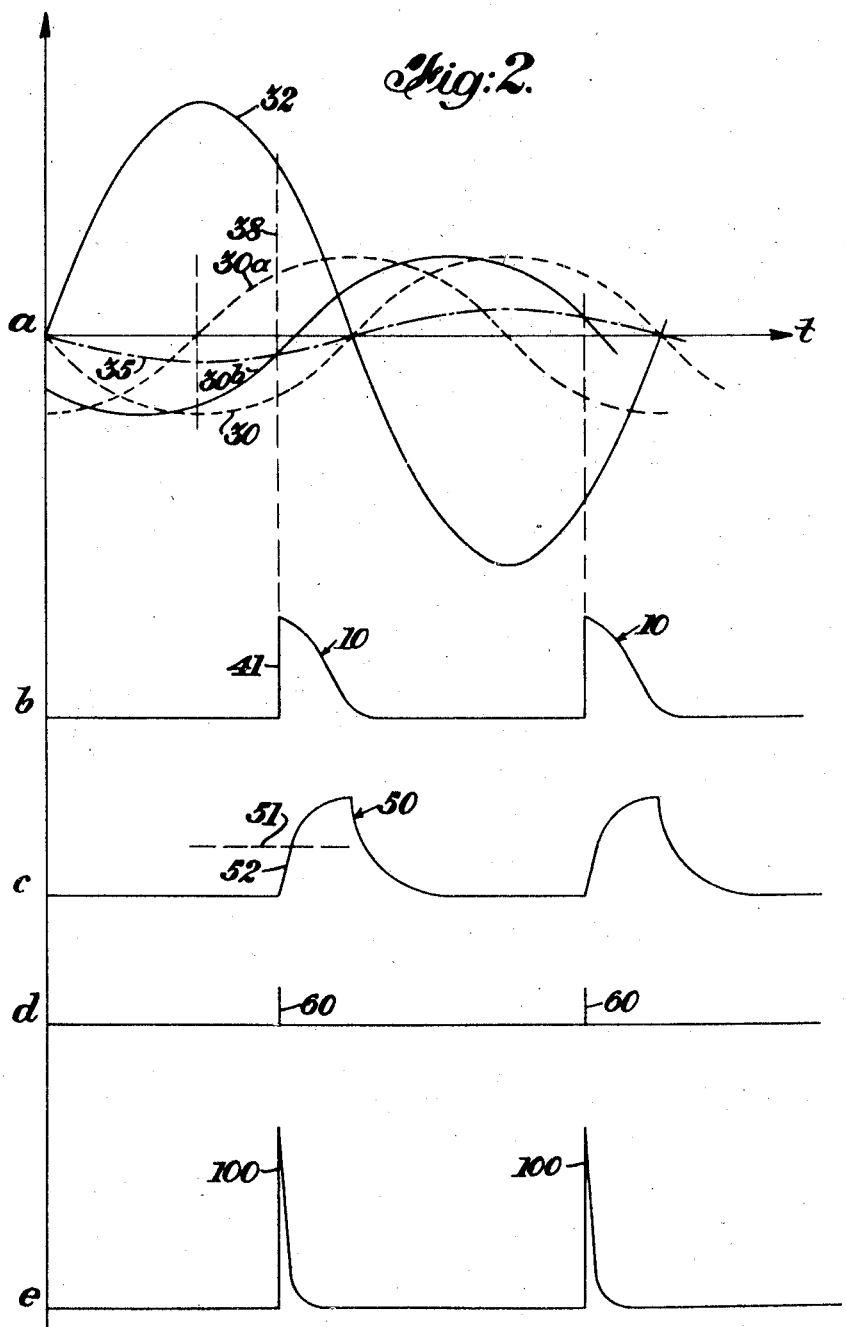

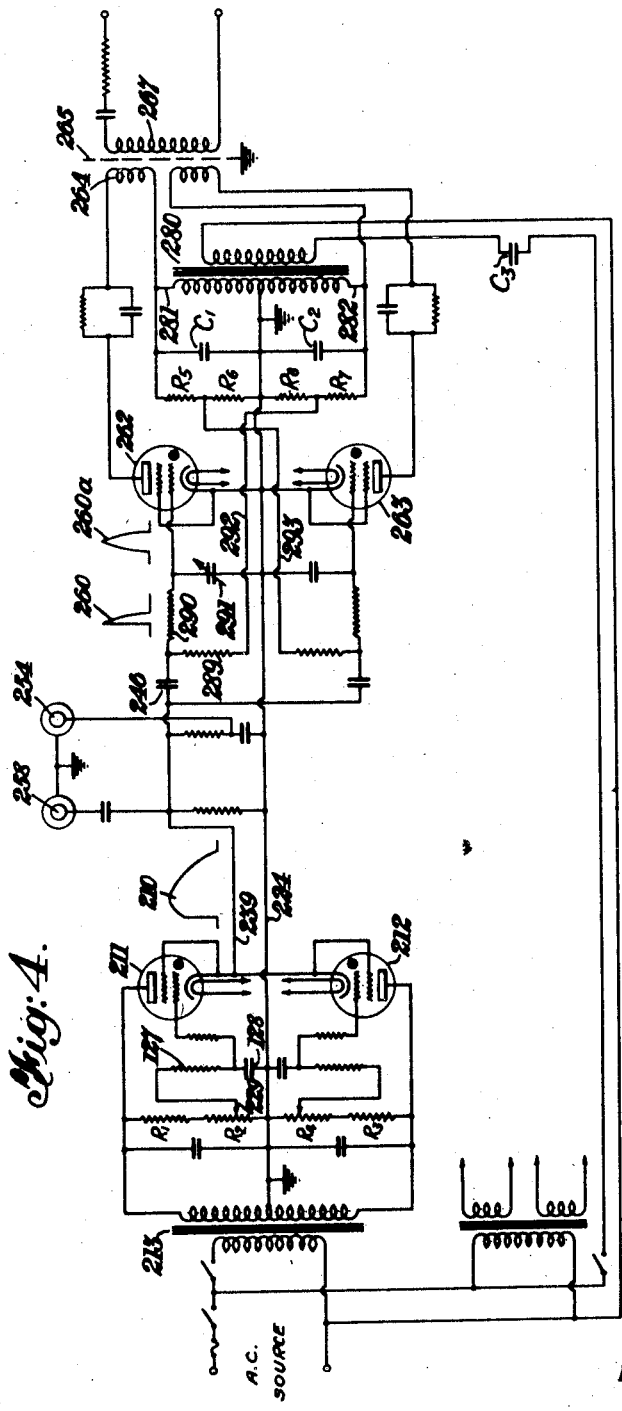

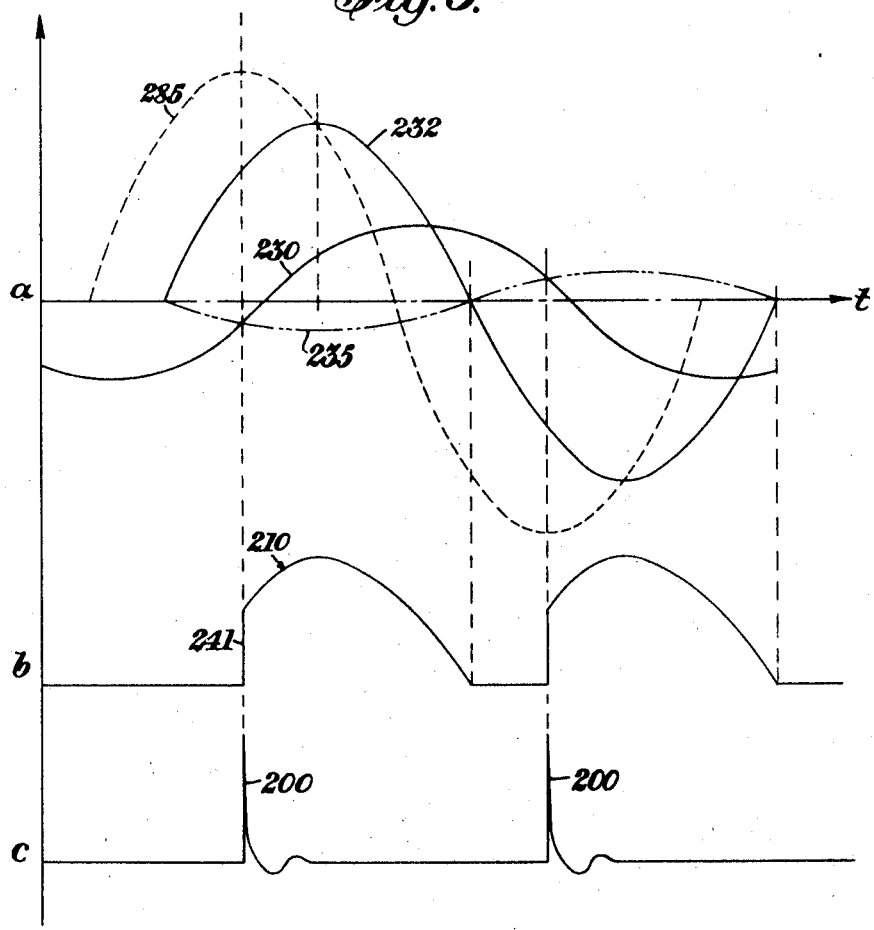

Patented Aug. 5, 1947

2,424,999

UNITED STATES PATENT OFFICE 2,424,999

PULSE GENERATING SYSTEM

Evert Manuel Ostlund, Montclair, N. J., and Paul W. Sokoloff, Forest Hills, N. Y., assignors to Federal Telephone and Radio Corporation, Newark, N. J., a corporation of Delaware Application March 13, 1943, Serial No. 479,012

7 Claims. (Cl. 250—27)

This invention relates to pulse generating systems and more particularly to the generation of pulses for synchronizing and other purposes.

One of the objects of this invention is to generate low and/or high potential synchronizing pulses from a relatively low voltage source of alternating current wherein the pulses are consistently reproducible in substantially a predetermined phase relation with respect to the source of alternating current.

Another object of the invention is to provide in addition to a high potential pulse a high speed sweep potential in a desired time relation with respect to the occurrence of the high potential pulse.

Still another object of the invention is to provide a high potential pulse and a low potential pulse together with a sweep potential wherein the phase relation of the low potential pulse and the sweep potential may be controlled with respect to the discharge of the high potential pulse.

The production of an initial pulse from an alternating current source is accomplished according to our invention by applying alternating voltage in a particular phase relationship to the electrodes of a gas-discharge tube. The voltage applied to the grid, for example, is shifted in phase so as to provide a bias in phase opposition to the anode voltage. Control of the conduction of the tube may be accomplished by controlling the phase shift of the potential applied to the grid, or by amplitude control with a fixed phase shift. When the phase shifted voltage on the grid overcomes the critical negative grid bias, conduction is initiated thereby producing a sudden flow of current through the tube resulting in a sharp increase in potential at the cathode of the tube thereby defining a substantially vertical leading edge for the pulse. The trailing edge of the pulse is controlled by decrease of the anode voltage. The phase shifted voltage is such that the discharge through the tube is caused to occur in the desired portion of a half cycle of the alternating current supply, and where two tubes are used in push-pull relation, pulses are produced one for each of the first and second halves of the cycle. These pulses may be differentiated to produce narrow pulsations substantially coincident with the leading edges of the pulses and used as low voltage synchronizing pulses. The pulse output of the tubes may also be shaped by an integration circuit so that the leading edge thereof can be used as a high speed synchronized sweep potential.

The high potential pulses are produced by providing a supply of energy either in the form of momentarily condenser-stored alternating current or stored direct current. The energy storing or supplying condenser is connected through a suitable circuit with the anode of an electron tube which is controlled by the aforementioned low voltage synchronizing pulsations. The anode circuit of the electron tube may include the primary of a transformer so that when the tube is triggered by a pulsation the stored energy is discharged through the primary of the transformer thereby producing a high potential in the secondary thereof. The duration of the conduction may be controlled so that the secondary output constitutes a high potential pulse of short duration. Other arrangements may be provided to produce the high potential pulse such as by a power amplifier tube controlled by the pulsations. The anode of this tube is connected to the energy supplying condenser or other source. The triggering operation is similar as above-described except that in place of a transformer a load resistor is connected between the energy storing condenser and ground. In either arrangement the power required to provide a cut-off bias for the electron tube whatever its characteristics might be may be supplied from either a rectifier or a transformer.

In many instances, it is desirable to provide low voltage pulses or sweep potentials in association with a high potential pulse. For example, they may be useful for blocking purposes as in the case of radio detection apparatus where it is desirable to block receiver equipment during the transmission of a high potential impulse. Thus, the output of low voltage pulses and the initiation of the sweep potential may be arranged to lead or lag the discharge of the high potential synchronizing pulses. The high potential pulse is particularly useful for synchronizing purposes such as where high peak voltages of 3,000 volts more or less across say a resistor of 25,000 ohms load are required. As a specific example, the high potential pulses produced by this invention are especially useful for synchronizing a 15,000 volt 100 kilowatt peak power output of a modulator such as disclosed in the copending application of Labin-Ostlund, Serial No. 475,738, filed February 13, 1943.

For a further understanding of the invention, reference may be had to the following detailed description to be read in connection with the accompanying drawings, in which:

Fig. 1 is a schematic wiring diagram of the pulse generating system according to this invention;

Fig. 2 is a graphical illustration of the operating features of the system in Fig. 1;

Fig. 3 is a schematic wiring diagram of a second embodiment of the invention;

Fig. 4 is a schematic wiring diagram of a third embodiment, and

Fig. 5 is a graphical illustration of the operating of the embodiment in Fig. 4.

Referring to Figs. 1 and 2, the pulses 10 initially generated by the system are produced by a circuit comprising two gas-discharge tubes 11, 12 and a transformer 13 to which is coupled a source of alternating current 15 preferably sinusoidal as indicated by the voltage 32 of curve a. The secondary 14 of the transformer is connected in push-pull relation by connections 16 and 19 to the anodes 17 and 18 of the tubes 11 and 12. The circuit connections between the two tubes and the secondary 14 are identical so that only the connections to the tube 11 need be discussed. Interposed between the connection 16 and a midground tap 20 on the secondary 14 is a condenser 21. Two resistors $R_1$ and $R_2$ are provided between the connection 16 and a ground lead 24 which is connected to the tap 20. Likewise, resistors $R_3$ and $R_4$ are connected between the ground lead 24 and the opposite connection 19. The resistors $R_1$, $R_3$ are preferably of considerably larger value than the resistors $R_2$ and $R_4$.

To provide proper grid control of the tube 11, the grid 26 is connected by isolating resistor 25 through an attenuating and phase shifting network comprising a variable resistor 27 and a condenser 28 to an adjustable contact 29 on the opposed phase resistor $R_4$. As shown at a in Fig. 2, this provides an attenuated biasing potential 30 on the grid 26 which is properly phased with respect to the anode potential 32, both potentials varying from positive to negative according to the source of alternating current 15. Adjustable contact 29 controls the amplitude of the grid potential 30. Adjustment of the variable resistor 27 may vary the phase of the potential 30 approximately 90° as indicated by the curve 30a. To cause the tube to fire at a particular point along the curve of the anode voltage 32, a shift in phase from 30 toward 30a is required. Where a shift in phase has been effected to the phase condition represented by curve 30b, the tube is caused to fire at a potential such as indicated by the dotted line 38 when the bias 30b becomes more positive than the critical grid bias of the tube as represented by curve 35. This flow of current through the tube 11 produces at the cathode connection 39 a sudden rise in potential across the resistor 40 to ground lead 24, thereby producing a substantially vertical leading edge 41 for the pulse 10. The trailing edge of the pulse gradually diminishes due to the increased dropping off of the anode potential 32 beyond the line 38.

The tube 12 and the associated network produces in a like manner a second pulse 10 for the second half of the alternating current cycle. Thus, the two tubes 11 and 12 produce one pulse for each half cycle of the alternating current applied to the transformer 14. The occurrence of these pulses, that is the occurrence of the leading edges 41 thereof may be varied within limits throughout the major portion of the second and fourth quarters of the alternating current cycles.

If desired the pulses 10 may be caused to occur during the first and third quadrants of the cycle by interchanging the condenser 28 with the resistor 27 as will become clear hereinafter from the description of Figs. 4 and 5. Pulses 10 may also be caused to occur during each quadrant of a cycle by combining the circuits of Fig. 1 and Fig. 4. It will also be clear that a circuit may be provided to produce one pulse per cycle, the occurrence being in any desired quadrant. By additional tube circuits a multiple of pulses may be provided, the pulses occurring at desired points along the period of the alternating current.

Should it be desirable to provide a high speed sweep potential from the pulses 10 this may be done by providing an outlet connection 45 having a resistor 42 and a condenser 43, the resistor being connected to the lead 39 and the condenser to the ground lead 24. The time constant of this outlet connection increases in duration the pulses 10 similarly as shown at 50 (curve c, Fig. 2). By suitably clipping the expanded pulse 50 at a level 51, a substantially linear-inclined sweep 52 is provided. The connection 45 may be taken through a coaxial cable 54 the outer sheath of which is grounded at 55.

The pulses 10 may be used as low voltage synchronizing or blocking pulses by connecting onto the circuit at 58 through coupling condenser 57.

Before applying the energy of the pulses 10 to the gas-discharge tube 62, we preferably reshape the pulses by applying some to a differentiating circuit comprising condenser 46 and a resistor 89. This results in a series of narrow positive pulsations 60 each of which is in coincidence substantially with a leading edge 41 of the pulses 10. No appreciable negative pulsations are produced by the differentiation because of the gradual slope of the trailing edges of the pulses 10. Further, since only the positive pulsations 60 are applicable as triggering pulses, any negative pulsations produced may be disregarded. These positive pulsations 60 are applied to a negatively-biased gas-discharge tube 62 for the production of high potential pulses.

The tube 62 has an anode 63 connected to the primary 64 of a pulse transformer 65 which may be an air or iron core type. The secondary 67 of the transformer 65 is connected through a coupling condenser 68 and an isolating resistor 69 to an outlet terminal 70. The other end of the secondary 67 is grounded at 72. The primary 64 is connected through a circuit connection having a resistor 75 and a condenser 76 connected in parallel relation to an output connection 77 of a half wave rectifier 80. The rectifier 80 may be of any desired type and as shown may comprise a two electrode tube 81 suitably connected to a transformer 84 the primary 85 of which is connected to the source of alternating current 15. The rectifier 80 provides direct current to maintain a condenser 86 fully charged so as to supply an ample amount of energy whenever the tube 62 is rendered conductive by the pulses 60. The tube 62 is provided with a cut-off bias by connecting the grid 88 through resistors 89 and 90 to the negative side of the rectifier 80. The output of the differentiating circuit which provides the pulsations 60 is connected to the grid 88. The cathode 92 of the tube 82 is connected to the ground lead 24 which is also connected through a network of resistors 93 and 94 and a condenser 95 to the rectifier circuit 80.

Upon ignition of the tube 82 by the triggering operation of a pulsation 60, energy is discharged from the condenser 86 causing a high peak current pulse to flow through the condenser 76 and the primary 64 of the output transformer 65. This induces a high voltage pulse in the secondary 67 which is applied through the isolating resistor 69 in substantially the form indicated by the narrow pulse 100 (curve e) of from about 1 to 2 microseconds more or less. The resistor 75 operates as a bleeder which discharges the condenser 76 before initiation of a succeeding pulse. The time constant of the combination 75 and 76 constitutes the pulse repetition limitation of this circuit while resistor 75 controls the extinction of the tube 82.

This circuit provides a critically damped or damped oscillatory output pulse which is of high voltage peak amplitude when connected across a high resistance load such as 25,000 ohms or greater. These pulses 100 may be substantially coincident with the pulsations 60 or made to lag the pulsations 60. This is accomplished by providing an adjustable condenser 91 between the grid 88 and ground lead 24. By applying capacity at 91, the leading edges of the triggering pulsations 60 are sloped thereby delaying the triggering action.

In the embodiment shown in Fig. 3, we provide a similar circuit for generating the initial pulses 10 by means of two 4-electrode gas-discharge tubes 111 and 112. These tubes are connected in push-pull arrangement similar to the tubes 11 and 12 of Fig. 1 with the exception that the condenser 28 is replaced by capacitance 128. A selected capacitance 128 together with the adjusted voltage at contact 29 provide for variation of the phase angle of the control circuit voltage on the grid 126 of the tube 111. This variation may be accomplished by making the resistor 127 variable as in the case of resistor 27, Fig. 1. The cathode resistor 156 is connected to the common cathode lead of the tubes 111 and 112 and to the ground lead 124.

This circuit (Fig. 3) may be provided with a sweep potential outlet 154 and a synchronizing pulse outlet 158 similarly as in the case of the system of Fig. 1. Pulsations 60 are produced by the differentiating circuit 146, 189.

The generation of high voltage pulses by the circuit of Fig. 3 involves the use of a power amplifier tube 162 the grid 188 of which is connected to the output of the differentiating circuit as in Fig. 1. To provide an adjustable cut-off bias for the grid 188, a suitable rectifier 180 is connected to the secondary of a transformer 184 the primary of which is connected to the source of power 15. The grid connection 189 is tapped by an adjustable contact to a resistor 190 connected across the rectifier 180.

A second rectifier 202 is provided in association with a high voltage transformer 104. A condenser 205 is maintained fully charged by the rectifier 202 and one side thereof is connected to the anode 163 of the tube 162 while the other side thereof is connected to an output terminal 170 through a dropping resistance 206 and a coupling condenser 207. The operation of this circuit comprises the triggering of the power amplifier tube 162 operating to connect the high voltage charge on the condenser 205 through resistor 206 and condenser 207 across the output terminal 170 and ground. The output pulse is preferably critically damped so that substantially no trailing oscillations are produced after the initial pulse.

Where this high potential pulse is used for synchronizing the operation of the spark discharge type modulator disclosed in the aforesaid copending application of Labin and Ostlund, the synchronizing pulse voltage is applied to a spark gap of the spark generator thereof.

Referring to Figs. 4 and 5, still another embodiment of the invention similar to the embodiment shown in Fig. 1 is illustrated arranged to use alternating current instead of direct current as the stored energy for production of the high voltage pulses. In this embodiment no rectifiers are used. Since the circuit of Fig. 4 is in part identical with parts of the circuit of Fig. 1, only those portions differing therefrom need be described.

The initial pulse 210 is produced from the alternating current source applied through transformer 213 to two gas-discharge tubes 211 and 212. The circuit of this portion of the circuit is identical to the corresponding portion of Fig. 1 with the exception that the relation of the resistor 27 and the condenser 28 of the phase shifting circuit is reversed as indicated by the resistor 127 and condenser 128 relation shown in Fig. 4. Also the movable contacts for $R_2$ and $R_4$ are interchanged so that the contact 229 is now associated with the resistor $R_2$ instead of the resistor $R_4$. This provides a phase lagging positive bias for the tube 211 during the positive half of the alternating current cycle indicated by the voltage curve 232. By adjusting the contact 229, a phase shift can be effected causing the biasing grid voltage 230 for the tube 211 to lag the applied anode voltage 232. By adjusting the contact 229, the phase shift of the biasing voltage 230 may be varied for approximately the 90° of the first quadrant of the cycle represented by the curve 232. The tube 211 has a characteristic critical bias 235 which when crossed by the curve 230 will cause the tube to fire thereby producing an abrupt increase in potential on the cathode connection 239 as represented by the vertical leading edge 241 of the pulse 210 (curve b, Fig. 5). The conduction continues for substantially the remaining portion of the positive half cycle of curve 232 producing the curved trailing portion of the pulse 210.

Outlets 254 and 258 are provided for the purpose of furnishing a sweep voltage and synchronizing pulses of low voltage similarly as in the case of Figs. 1 and 3.

The pulses 210 from the tubes 211 and 212 are differentiated by the circuit including the condenser 246, the resistor 289 and $R_5$ thereby producing a narrow pulsation 260 in substantial coincidence with the leading edge 241. The pulsation 260 is applied through a resistor 290 and a condenser 291 for re-shaping as indicated by the pulse shape 260a. This re-shaping preferably slopes the leading edge of the pulse so that the triggering of the tube 262 may be delayed with respect to leading edge of synchronizing pulse 260. The degree of re-shaping may be controlled by adjusting the condenser 291.

The energy supplied for the anode circuit of the tube 262 is provided by a transformer 280. The mid-tap of the transformer 280 is connected to the ground bus 224. Load resistors R₅ and R₆ are provided between the terminal 281 of the secondary and the bus 224. Likewise, load resistors R₇ and R₈ are connected between the opposite transformer terminal 282 and the bus 224. R₅, R₆ and R₇, R₈ operate as voltage dividers and supply cut-off A. C. bias voltage to tubes 263 and 262 respectively. Connected in parallel with these resistors are two condensers C₁ and C₂ to provide a low impedance supply of energy.

It will be noted that an additional high voltage generating tube 263 is provided which is associated with the portion of the transformer 280 opposite the portion which supplies energy to the tube 262. This arrangement of the tubes 262 and 263 provides for the discharge of high voltage pulses in the first and third quadrants of the voltage supply cycle in response to the pulses 210 produced by the tubes 211 and 212. The anode circuits of the tubes 262 and 263 are each similar to the arrangement of the anode circuit for the tube 62 of Fig. 1. Each anode circuit is provided with a primary winding 264 of a pulse transformer 265. The secondary 267 is responsive to the pulsations produced in the anode circuits so as to provide an output of high voltage pulses 260.

In operation of the circuit, it is desirable to have the voltage supply for the condensers C₁ and C₂ at substantially maximum when the tubes 262 and 263 are triggered. This is obtained by providing a condenser C₃ in the primary circuit of the transformer 280. This capacitance together with the load resistance provided by R₅, R₆, R₇ and R₈ across the secondary produces a leading voltage such as indicated by the curve 285 curve a. This leading voltage is preferably arranged so that the maximum will occur at about the instants the tubes 262 and 263 are caused to fire. It will be noted that the tubes 262 and 263 are provided with opposite bias by the grid connections 292 and 293 through the resistors R₅ and R₈ respectively, to insure the tubes against firing in the absence of pulses 260.

The low impedance source of energy provided by the condensers C₁ and C₂ enables the tubes 262 and 263 when fired to produce high voltage pulsations resulting in pulses 260. As shown for example by the curve c of Fig. 5, the pulses 260 may be damped oscillations instead of critically damped pulses such as pulses 100.

While we have shown Fig. 4 as comprising circuit portions for firing in the first and third quadrants of the alternating current cycle, it will be understood that the circuit may be reduced to provide one pulse per cycle. By combining the circuit of Fig. 4 with a circuit similar to Fig. 1, high voltage pulses may be produced for each quadrant of the alternating current cycle, and by the addition of other such circuits a greater number of pulses per cycle may be produced.

While we have disclosed the principles of our invention in connection with several specific embodiments, it will be understood that the illustrations and descriptions are given by way of example only and not as limiting the scope of the invention as set forth in the objects and the appended claims.

We claim:

1. A system for generating pulses from a source of alternating current comprising a gas-discharge tube having anode, cathode and grid electrodes, means to apply alternating voltage from said alternating current source to the anode and grid electrodes, means to control the phase of the alternating voltage applied to one of said electrodes with respect to that applied the other electrode so as to determine the point along the period of the alternating current source at which the tube is rendered conductive, the tube being extinguished by a decrease of the alternating voltage at one of the electrodes, whereby a pulse is produced having a substantially vertical leading edge, means to differentiate the pulse to produce a pulsation of short duration substantially coincident with said leading edge, means including a transformer and condenser arrangement to supply alternating current energy from said source of alternating current, and control means coupled to said last named means operative in response to said pulsation to conduct said alternating current energy for production of a high potential pulse.

2. The system defined in claim 1 wherein said control means comprises an electron tube having a grid connected to the output side of the differentiating means and means receiving alternating current energy from said source of alternating current to provide a cut-off bias on said tube.

3. The system defined in claim 1 wherein said control means comprises a pair of electron tubes each having a grid connected to the output side of the differentiating means, and each said tube have a transformer winding and condenser arrangement in its anode circuit, and transformer means for supplying energy to said anode circuits from said alternating current source.

4. The system defined in claim 1 wherein said control means comprises an electron tube having an anode, said transformer having its primary connected in circuit with said anode, means to transmit said pulsation to said electron tube, the means to supply energy being so coupled that when the tube is triggered by said pulsation said energy is conducted through said transformer thereby producing a high potential pulse in the secondary thereof.

5. The system defined in claim 1 wherein said control means comprises an electron tube having an anode together with a condenser, said transformer having the primary thereof connected in circuit with said anode and said condenser, means to transmit said pulsation to said electron tube, the means to supply energy being so coupled that when the tube is triggered by said pulsation said energy is conducted through said transformer thereby producing a high potential pulse in the secondary thereof, said condenser being arranged in said circuit to control the duration of the flow of current producing the high potential pulse.

6. A system for generating pulses of high potential from a source of alternating current comprising means to produce from the alternating current source a low potential pulse having a substantially vertical leading edge, means to differentiate the low voltage pulse to produce a pulsation of short duration substantially coincident with said leading edge, means to supply alternating current energy from said source of alternating current comprising a capacitance arranged to receive alternating current from said source, means operative in response to said pulsation to conduct said energy for production of a high potential pulse, and means to shift the phase of the energy applied to said capacitance so that a maximum supply is timed for the conduction produced in response to said pulsation.

7. The system defined in claim 6 wherein the means operative in response to said pulsation comprises a grid controlled electron tube having an anode, a transformer having the primary thereof connected to said anode and to the means to supply energy so that when said tube is triggered by said pulsation, current is caused to flow through said primary thereby producing a high potential in the secondary of the transformer.

EVERT MANUEL OSTLUND.
PAUL W. SOKOLOFF.

REFERENCES CITED

The following references are of record in the file of this patent:

UNITED STATES PATENTS

| Number | Name | Date |
|---|---|---|
| 2,309,525 | Mohr | Jan. 26, 1943 |
| 1,986,627 | Edwards et al. | Jan. 1, 1935 |
| 2,166,688 | Kell | July 18, 1939 |
| 2,230,926 | Bingley | Feb. 4, 1941 |
| 2,150,265 | Conover | Mar. 14, 1939 |
| 2,280,949 | Hall | Apr. 28, 1942 |
| 2,006,737 | Gessford | July 2, 1935 |
| 2,020,930 | Berthold et al. | Nov. 12, 1935 |

FOREIGN PATENTS

| Number | Country | Date |
|---|---|---|
| 810,479 | France | Dec. 28, 1936 |